United States Patent
Bajema

Patent Number: 5,833,868
Date of Patent: Nov. 10, 1998

[54] PORTABLE WATER RECYCLER

[75] Inventor: Rick W. Bajema, Rhinelander, Wis.

[73] Assignee: Recot, Inc., Pleasanton, Calif.

[21] Appl. No.: 884,672

[22] Filed: Jun. 27, 1997

[51] Int. Cl.⁶ ............................................. B01D 21/26
[52] U.S. Cl. .................. 210/788; 210/805; 210/806; 210/194; 210/241; 210/257.1; 210/259; 210/297; 210/304; 210/360.1; 210/416.1; 210/512.1; 210/512.2; 15/3; 15/3.1; 15/10
[58] Field of Search ................... 210/787, 788, 210/805, 806, 167, 194, 241, 257.1, 258, 259, 295, 297, 304, 354, 360.1, 416.1, 512.1, 512.2; 15/3, 3.11, 10

[56] References Cited

U.S. PATENT DOCUMENTS

| | | |
|---|---|---|
| 955,843 | 4/1910 | Bossert . |
| 2,919,898 | 1/1960 | Marwil et al. . |
| 3,456,798 | 7/1969 | Urdanoff . |
| 3,540,588 | 11/1970 | Estabrook . |
| 4,033,866 | 7/1977 | Enzmann . |
| 4,042,507 | 8/1977 | Langmack . |
| 4,234,424 | 11/1980 | Piepho . |
| 4,424,125 | 1/1984 | Martin . |
| 4,525,284 | 6/1985 | Saalasti . |
| 4,571,301 | 2/1986 | Inskeep, Jr. . |
| 4,661,251 | 4/1987 | Wykoff . |
| 4,772,400 | 9/1988 | Kreyenberg . |
| 4,855,065 | 8/1989 | Keeter et al. . |
| 5,047,157 | 9/1991 | Hoffman et al. ..................... 210/787 |
| 5,076,915 | 12/1991 | Rose . |
| 5,110,457 | 5/1992 | Krawl et al. ......................... 210/787 |
| 5,185,087 | 2/1993 | Lister et al. . |
| 5,344,255 | 9/1994 | Toor .................................... 210/767 |
| 5,543,063 | 8/1996 | Walker et al. . |

*Primary Examiner*—David A. Reifsnyder
*Attorney, Agent, or Firm*—Rothwell Figg Ernst & Kurz

[57] ABSTRACT

A portable water recycler for cleaning and recycling water used in a produce washing system or another similar system. The portable water recycler is most particularly advantageous in the recycling of water used in a potato washing system. The portable water recycler includes a conveyor filter which removes and conveys debris generally laterally while allowing water to pass generally vertically through a funnel and into a reclaiming tank. The reclaiming tank has a sloped floor and a bottom outlet. Dirty water is discharged from the bottom outlet and pumped through at least one centrifugal separator for further separation of particulate material from the water.

30 Claims, 5 Drawing Sheets

FIG. 5A
FIG. 5B
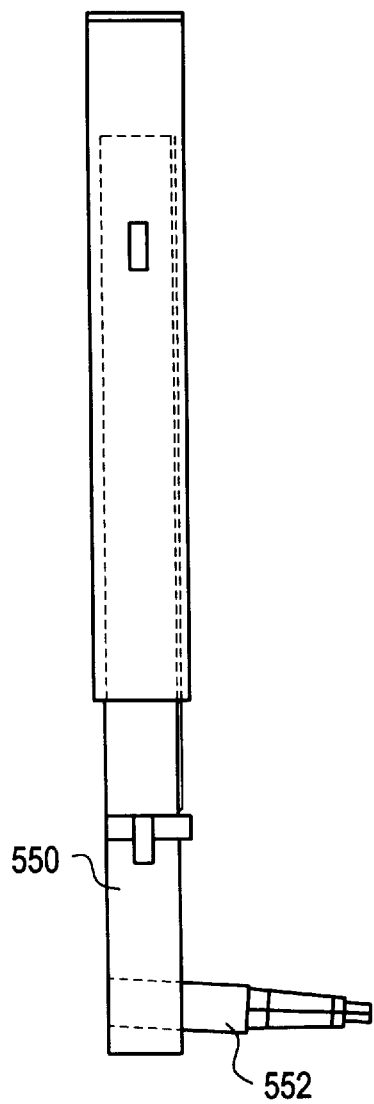
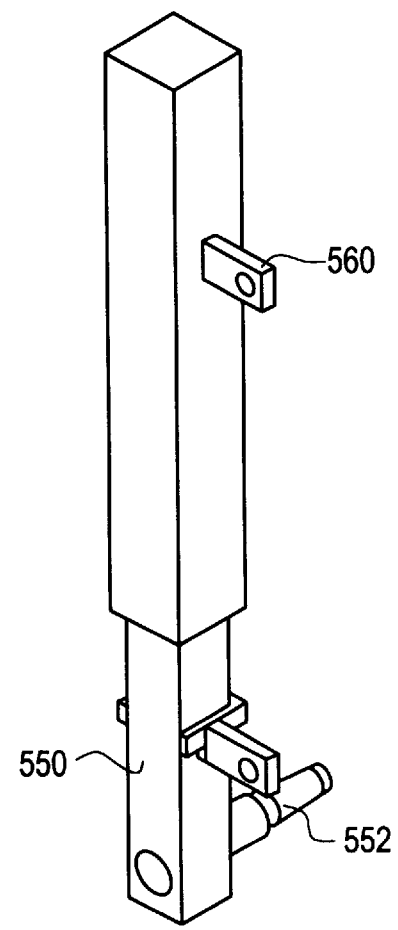

PORTABLE WATER RECYCLER

BACKGROUND OF THE INVENTION

1. Field of the Invention

The present invention relates to devices for removing debris from a liquid and, more particularly, to devices for cleaning and recycling water in a system requiring de-sedimented water (i.e., water with a reduced sediment content). The most preferred applications of the present invention involve the cleaning and recycling of water used in produce washing systems—including systems for washing, e.g., root commodities such as potatoes, beets, carrots, etc., citrus commodities such as oranges, etc., and other fruits and vegetables such as apples, berries, tomatoes, etc. The present invention is most particularly advantageous in the recycling of water used in potato washing systems.

2. Description of the Related Art

A variety of known systems require de-sedimented water for optimal performance. For example, in potato washing systems, which use recycled water for washing the surfaces of potatoes, the water can become filled with debris and sediment which, for optimal performance, should be removed from the water. Often, the contaminated water is merely discharged from the potato washing system and new clean water is added to compensate for the water loss. This method has a number of drawbacks. First, this method results in excessive water loss and increased costs. Second, discharging contaminated water is not environmentally sound and can cause pollution. This common method also requires an available water source for supplying new water, as well as an available location to discharge the dirty water to. As a result, there are limitations in the locations available for using such systems, and these systems are not portable.

It has also been a known practice to recycle water used in potato washing systems within large settling, or clarification, tanks and/or settling ponds. These tanks have rather large volumes, e.g., typically, ranging from about 2000 to 500,000 gallons. As a result, the residing time within these tanks or ponds is quite long. Thus, this method also has a number a drawbacks. For example, the increased residing time results in bacterial and other contamination problems. The large tank or pond sizes also eliminate any potential for transportability of the systems.

There are a variety of systems known for cleaning dirty water. For example, drinking water is typically cleaned in a municipal clarification system prior to use. However, existing municipal water systems and other systems that may provide sufficient cleaning capabilities are typically very expensive, large and complicated devices.

There are no acceptable systems which can remove debris and sediment from a potato washing system, or from another system having similar water requirements, and return the de-sedimented water to the system for continued use. There are also no known systems which can be easily transported to an appropriate location for recycling water in such a system.

The existing art contains an assortment of methods and devices for cleaning liquid. However, the existing art is inappropriate for recycling water used in produce washing systems or in other similar systems.

The following paragraphs describe a number of known methods and devices that are only generally relevant to the technology of water cleaning.

U.S. Pat. No. 955,843 shows a separating device having conveyor chains 15 with wipers 17. The wipers 17 carry refuse off of a screen 2 while water passes through the screen 2 and into a trough 20.

U.S. Pat. No. 3,540,588 shows a method for separating solid particles from a flow of machine tool coolant. The method includes a settling tank 12 containing dirty liquid, a hydrocyclone 13 which receives liquid from the tank 12, and a transfer tank 15 which receives clean liquid from the hydrocyclone. The tank 12 includes a drag conveyor 24 as shown in FIG. 4.

U.S. Pat. No. 4,033,866 shows a method for separating solid particles from a liquid, and for separating two different weight liquids from a liquid mixture. The apparatus includes a tank 10 having an outlet 53 which is directed to hydrocyclones 58.

U.S. Pat. No. 4,042,507 shows a device for removing water-borne matter in order to re-use the water. The device includes a tank 10 having an inlet A, and outlet B, and a filtering conveyor 12 of a fine mesh wire through which the liquid passes.

U.S. Pat. No. 4,234,424 shows a transportable vehicle trailer apparatus for the purification of oily emulsions. The device includes a reaction container 1 having a pipe 5 at the bottom for collecting a sludge mixture.

U.S. Pat. No. 4,525,284 shows a method for the clarification of water in the processing of wood and paper materials. The system includes a conveyor 2 having a perforated sheet bottom. Water flows through the conveyor, into a pipe 3, and into a vertical clarifier 7. A collector tank 9 for collecting clean water is located at the upper portion of the clarifier 7, and an opening 12 for discharging heavier particles is located at the bottom of the clarifier.

U.S. Pat. No. 5,076,915 shows an apparatus for removing suspended solids from a liquid. In the embodiment shown in FIG. 2, a gravity settler 30 is shown having a converging bottom portion 51, baffles 54 and 66, an outlet 68 for clarified liquid, and a discharge washing zone 58. The apparatus serves as a gravity settler for separating finely divided solids such as coal from a liquid.

U.S. Pat. No. 5,543,063 teaches a method for washing dirt from produce and for recovering chemical treating agents used in such a method. The system includes a storage tank 22 which receives liquid from the washing system. Liquid within the storage tank 22 is filtered in a filtration assembly 26 which includes a screen 32 at the top of a tank 30, a pump 40 which directs liquid from the tank 30 to a hydrocyclone 36, a settling tank 46 which receives solids from the hydrocyclone, and a self-cleaning filter 52.

There remains a need for an apparatus which can reliably separate debris and sediment from water in produce washing systems or in other systems having similar water requirements. There also remains a need for a system that is easy to fabricate, inexpensive, and not overly complicated. There is also a need for a system that is compact and/or transportable. There is also a need for a system that can conserve water and avoid environmental contamination. There is also a need for a system that reduces residing times of the recycled water in order to prevent bacterial build-up.

SUMMARY OF THE INVENTION

The present invention overcomes the above-noted and other problems pertaining to existing methods of providing de-sedimented water (i.e., water with a reduced sediment content) in systems, such as in produce washing systems and the like.

According to a first aspect of the invention, a portable water recycler is provided which includes: a) a supply conduit which supplies dirty water from the system to the portable water recycler; b) a conveyor filter which receives the dirty water from the supply conduit and which removes and conveys debris generally laterally while allowing the water to pass generally vertically; c) a reclaiming tank below the conveyor filter having a funnel shaped floor with a discharge outlet; d) a funnel below the conveyor filter which directs the filtered water from the conveyor filter to a lower region of the reclaiming tank, the funnel having an outlet located above the discharge outlet of the reclaiming tank; e) a discharge conduit extending from the discharge outlet to at least one centrifugal separator, each centrifugal separator having a first outlet which outputs de-sedimented water and a second outlet which outputs concentrated dirty water; and f) a return conduit for returning de-sedimented water to the system from an upper region of the reclaiming tank or from the first outlet of each centrifugal separator.

According to another aspect of the invention, the portable water recycler of claim 1, further includes a frame supporting the tank, the conveyor filter, and the centrifugal separator, and a plurality of wheels mounted to the frame for transporting the portable water recycler to a desired location, such as using a hitch mechanism mounted to the frame for pulling the portable water recycler behind a towing vehicle.

According to another aspect of the invention, the water recycler can be permanently installed at a cite location. That is, the device can be mounted so as to be stationary and/or permanent. As one example, the above-noted frame structure can be rested on or can be attached to a floor surface. A permanent recycler does not have to be constructed to be transportable, e.g., with wheels, hitch mechanisms, etc. Nevertheless, the most preferred embodiments are transportable.

According to another aspect of the invention, the portable water recycler further includes a pump supported on the frame for pumping dirty water (e.g., from the bottom of the reclaiming tank) to the centrifugal separators. In addition, a second pump can be also be supported on the frame for sucking de-sedimented water from an upper region of the tank.

According to another aspect of the invention, the conveyor filter includes a filter and a conveyor belt or chain having at least one cross member for pushing debris along the filter.

According to another aspect of the invention, the filter preferably has openings with a diameter less than about 0.05 inches, and more preferably between about 0.02 and 0.04 inches wide.

According to another aspect of the invention, the filter is preferably a wedge-wire filter having wires with triangular cross-sections. The wires are preferably oriented parallel to the direction of travel of the at least one cross member which pushes debris along the filter.

According to another aspect of the invention, the portable water recycler is provided in combination with a produce washing system for washing produce with water, such as any known produce washing system.

The present invention is capable of reliably separating sediment material from water in produce washing systems or in other systems having similar water requirements. The present invention can also be easy to fabricate, inexpensive, and not overly complicated. The present invention can also be compact and/or transportable. The present invention can also conserve water and avoid environmental contamination. In contrast to prior settling systems, the functionality of the present system does not have to be dependent on the volume of water in the system. Further, the present invention can also reduce residing times of debris in order to prevent bacterial build-up.

The above and other advantages, features and aspects of the present invention will be more readily perceived from the following description of the preferred embodiments thereof taken together with the accompanying drawings and claims.

BRIEF DESCRIPTION OF THE DRAWINGS

The present invention is illustrated by way of example and not limitation in the accompanying drawings, in which like references indicate like parts, and in which:

FIGS. 5(A) and 5(B) illustrate side and perspective views, respectively, of the adjustable wheel-mounting structure according to one preferred embodiment.

DETAILED DESCRIPTION OF THE
PREFERRED EMBODIMENTS OF THE
INVENTION

Figure 1:
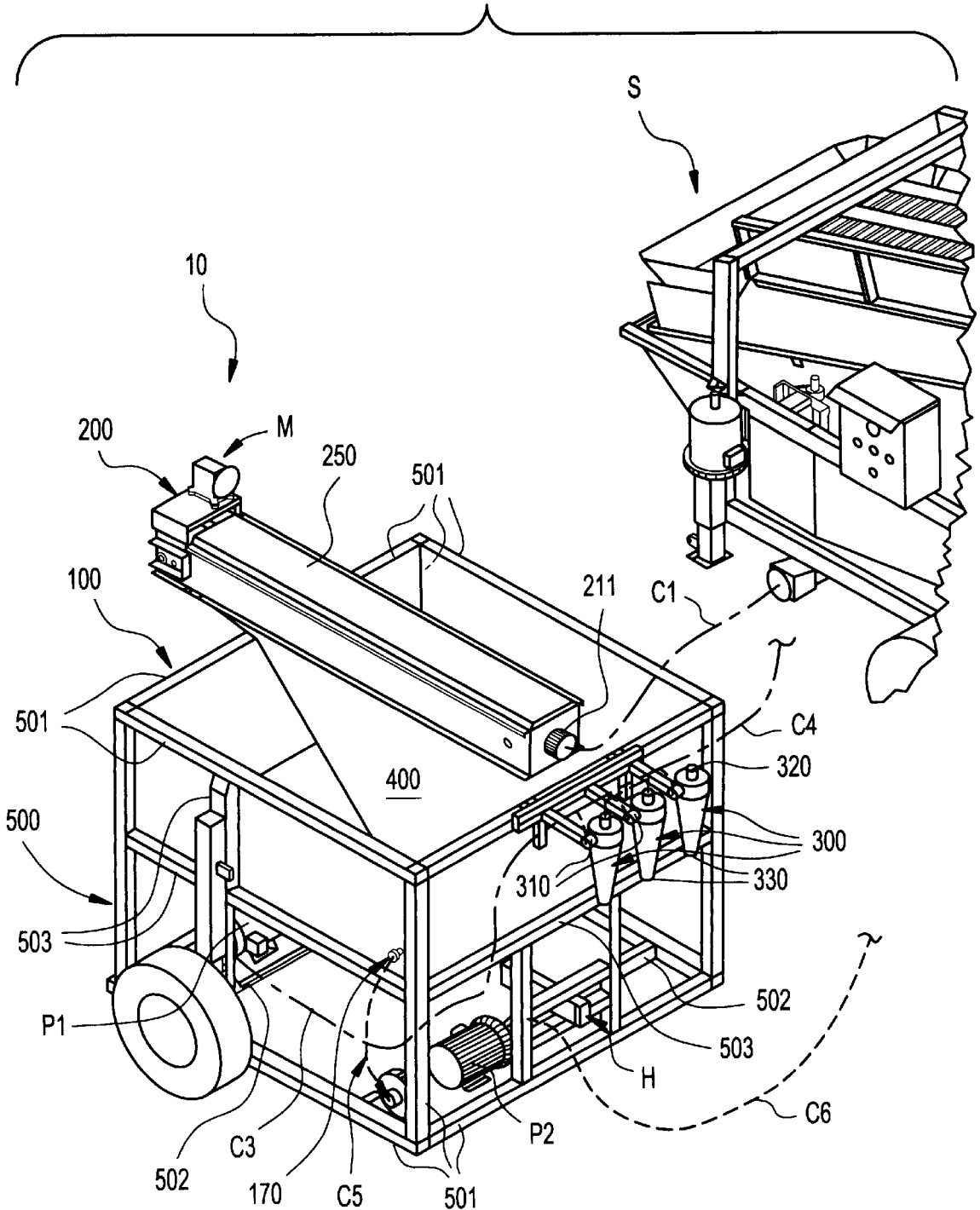
FIG. 1 is a perspective view of a portable water recycling system according to a preferred embodiment of the invention.

FIG. 1 illustrates a preferred embodiment of a portable water recycling system according to the present invention. As illustrated, the portable water recycling system 10 is used to remove debris and sediment from water in a nearby system S, such as, e.g., a potato washing system.

The preferred construction of the portable water recycling system 10 includes (1) a reclaiming tank 100, (2) a conveyor filter 200, (3) at least one centrifugal separator 300, (4) a funnel 400 between the conveyor filter 200 and the tank 100, and (5) a frame 500 for mounting the components of the system.

In summary, dirty water from the system S is directed into the conveyor filter 200 via the conduit C1. The conveyor filter 200 conveys away larger debris while allowing filtered water to fall vertically into the tank 100 via the funnel 400. As shown in FIG. 3(B), the reclaiming tank 100 directs concentrated dirty water through a bottom opening 110 while de-sedimented water rises to the upper portion 120 of the tank surrounding the funnel 400. The dirty liquid is discharged through the opening 110 and is delivered through the conduit C2 to a pump P1 which pumps the dirty water to the centrifugal separator(s) 300 via the conduit C3. The centrifugal separators are preferably hydrocyclones (as shown at 300) which operate in a known manner. Specifically, the hydrocyclones circulate the dirty water so that concentrated dirty water is discharged from a bottom outlet while de-sedimented water is discharged from a top outlet into the conduit C4. One example of a hydrocyclone filter that can be used is Model No. 240W by Quality Solids Separation, Houston, Tex. The terminology centrifugal separator is used herein to describe known devices which separate materials by centrifugal, or swirling, motion of the materials. Although less preferred, centrifugal separators other than hydrocyclones can be used. An example of another less preferred centrifugal separator is a device known as a LAKOS(tm) filter by Lakos Filtration Systems, Fresno, Calif. The de-sedimented water in the conduit C4 can be returned to the system S as needed, or can be delivered to the upper portion 120 of the tank 100 for later delivery to the system S, or can be returned to the conveyor filter 200 for additional filtering.

The fineness of the sediment removed (e.g., sand, silt, or clay) can be controlled in the selection of the centrifugal separators 300. Depending on the requirements of the system S, for example (a) centrifugal separators which only de-sand can be used, or (b) centrifugal separators which can de-silt can be used, or (c) centrifugal separators which can even de-clay can be used. In produce washing systems, for example, it is most preferred to have separators which de-silt.

Figure 3A:
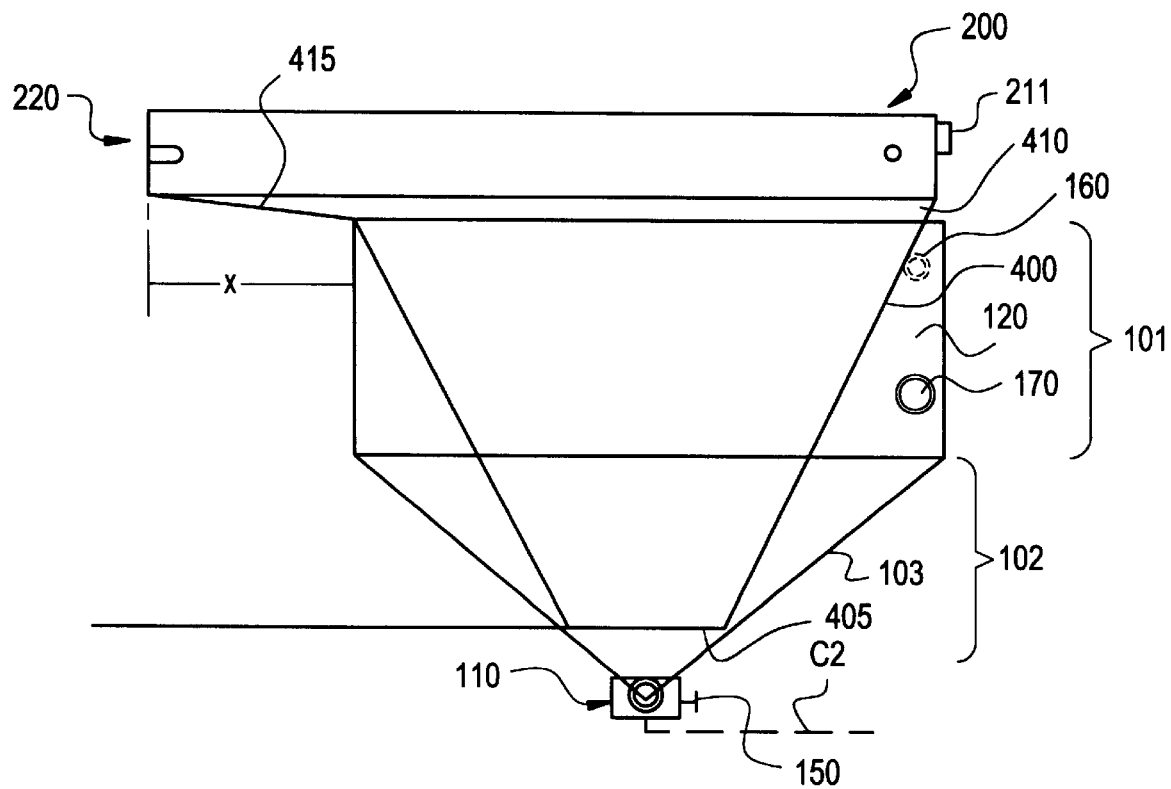
FIG. 3(A) is a side view of the portable water recycling system shown in FIG. 1 illustrating preferred dimensions of the structure.
Figure 3B:
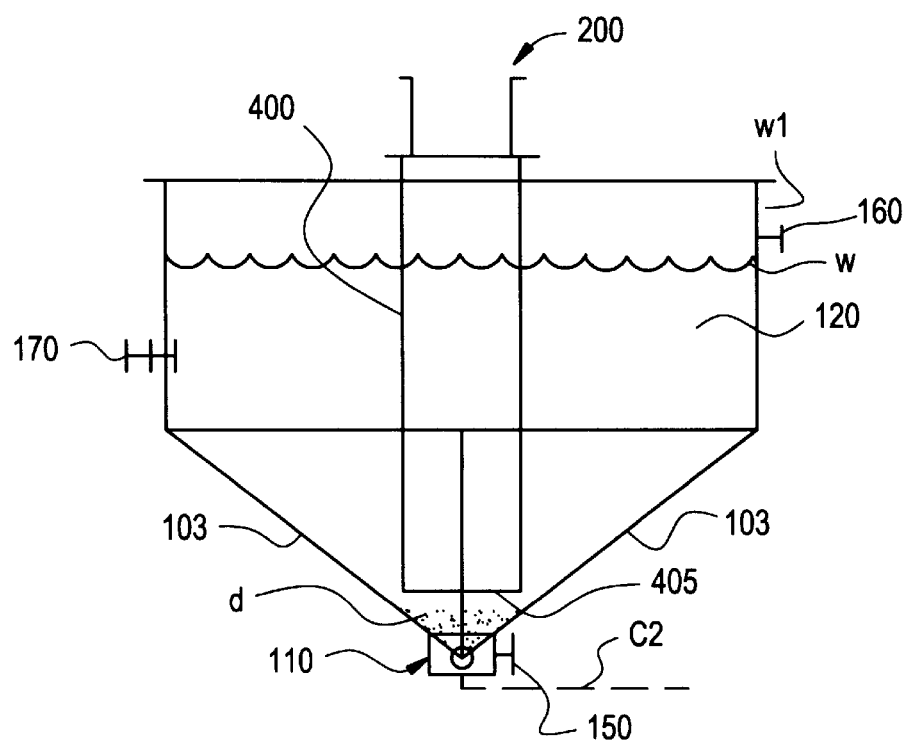
FIG. 3(B) is a front view of the portable water recycling system shown in FIG. 1 illustrating preferred dimensions of the structure.

One preferred structure of the reclaiming tank 100 and the funnel 400 is shown in FIGS. 3(A) and 3(B). As illustrated, the tank 100 preferably includes a wide upper section 101 and a converging, or funnel-shape, lower section 102. The funnel 400 preferably extends from the bottom of the conveyor filter 200 to a location proximate the lower end of the converging lower section 102. Sediment (e.g., sand, silt, and/or clay) can be funneled along inclined surfaces 103 to the bottom opening 110. On the other hand, de-sedimented water passes around the bottom 405 of the funnel 400 and rises to the upper portion 120 of the tank. The angle of inclination of the surfaces 103 should be greater than the angle of repose of the sediment within the dirty water. Preferably, this angle is greater than approximately 35°. In alternative embodiments, the funnel-shape section 102 can have a horizontal cross-section that is circular, hexagonal, irregular, etc., and the funnel-shape section 102 can also be asymmetrical.

As shown in FIG. 3(B), the de-sedimented water will assume, for example, a water level W while the sediment D will be discharged from the bottom of the tank 100. An overflow outlet 160 is provided proximate the upper end of the reclaiming tank 100 to ensure that the water does not flow over the top edge of the tank. Any excess water in the tank 100 can be discarded, or stored in a standby tank (not shown), or can even be returned to the washing system. The sediment D will be actively discharged and should not pile up at the bottom of the tank. In this regard, the volume flow rate of the dirty water into the bottom opening 110 should be sufficiently high, e.g., possibly between about 100 to 450 gallons per minute to remove the sediment. FIGS. 3(A)—3(B) also illustrate preferred dimensions, in inches, of one exemplary embodiment of the invention. The system can also include a valve 150 for closing the bottom opening 110 when the system is not in use. The valve 150 is preferably located within the conduit C2 below the tank.

Figure 2:
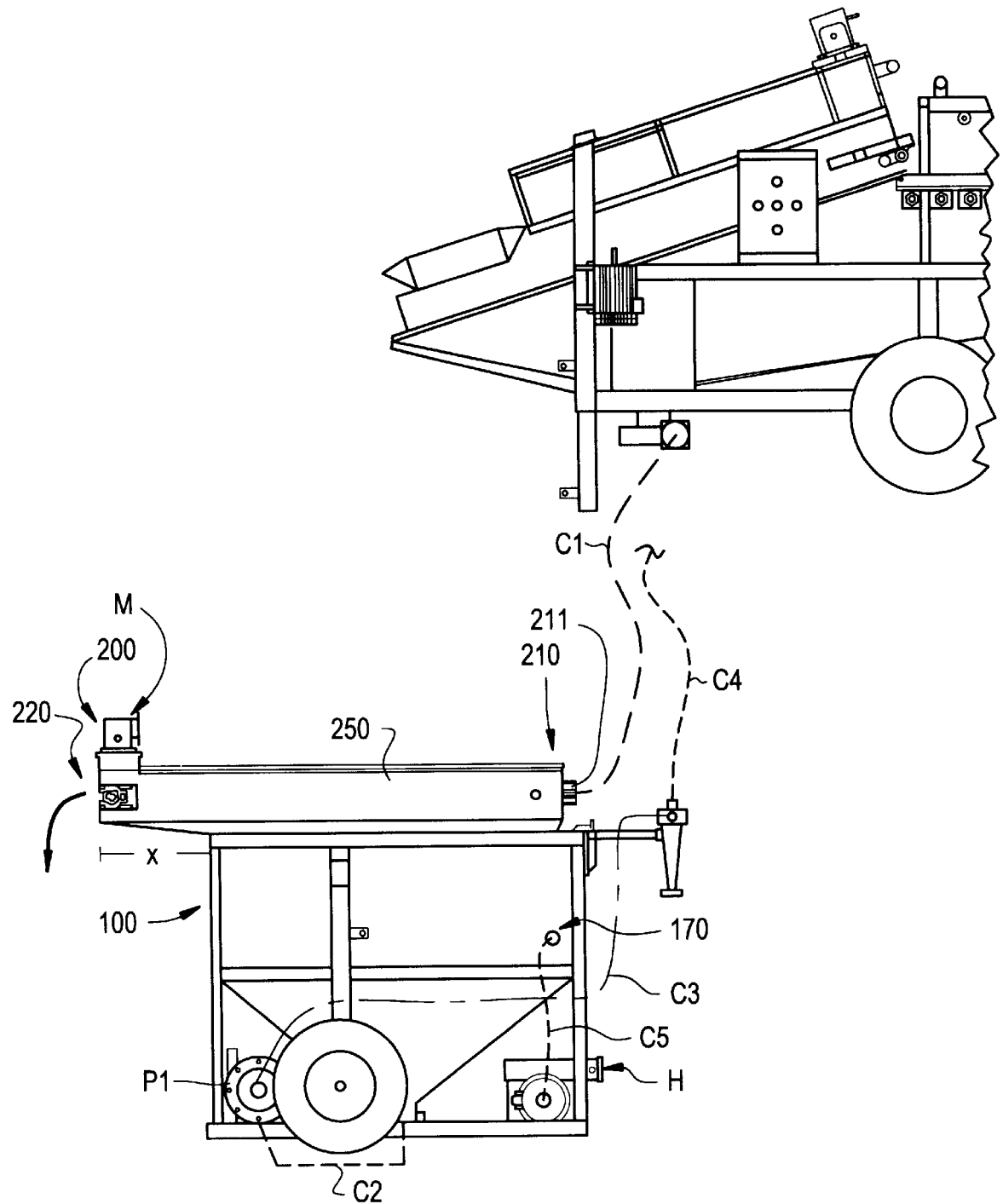
FIG. 2 is a side view of the portable water recycling system shown in FIG. 1.
Figure 4A:
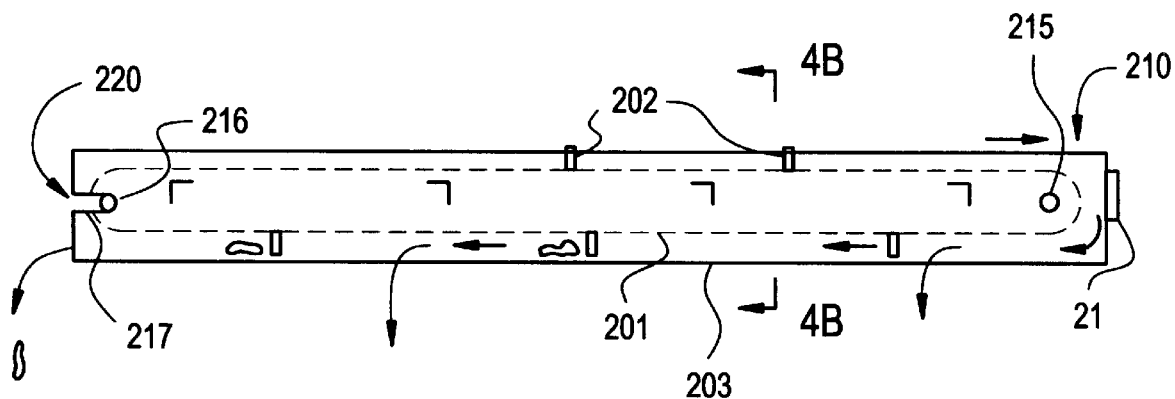
FIG. 4(A) is a cross-sectional side view of the preferred conveyor filter structure used in the portable water recycling system shown in FIG. 1.
Figure 4B:
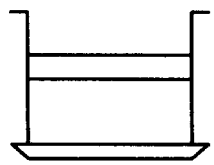
FIG. 4(B) is a cross-sectional front view taken along the arrows 4(B)—4(B) in FIG. 4(A)
Figure 4C:
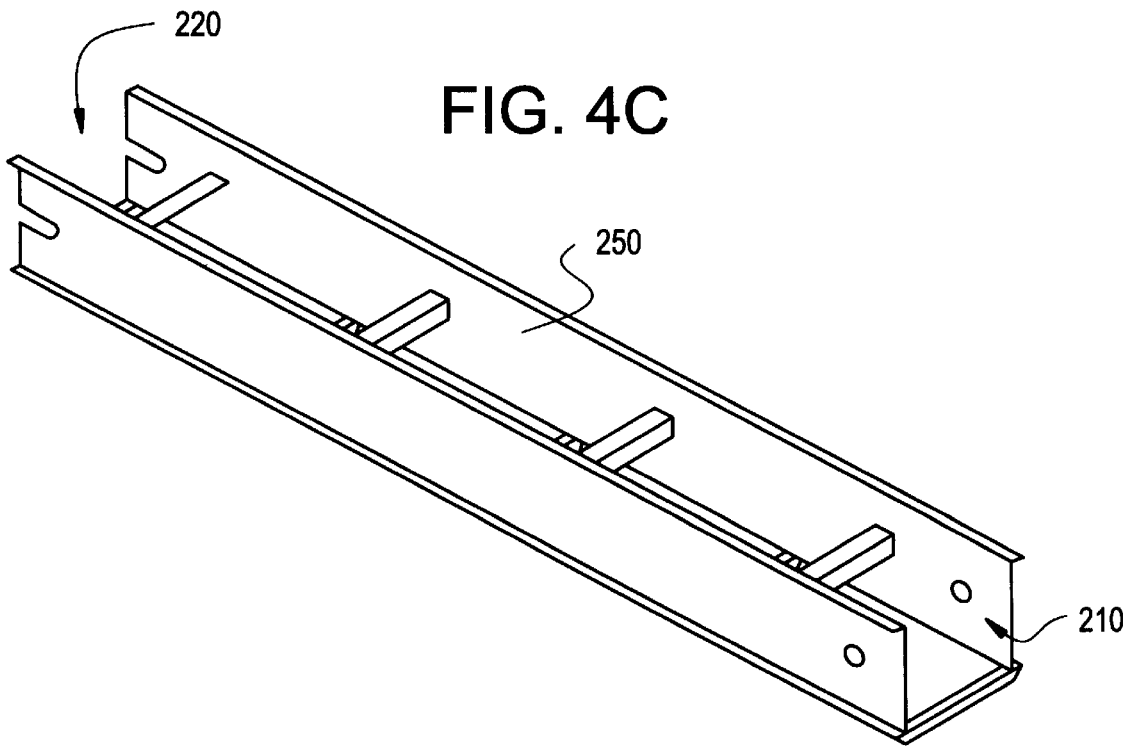
FIG. 4(C) is a perspective view of a portion of the conveyor filter illustrated in FIGS. 4(A) and 4(B)

As illustrated in FIG. 2, the conveyor filter 200 preferably includes a container 250 having an input end 210 and a discharge end 220. Dirty water enters the input end 210 through the conduit C1 and the input opening 211. The conveyor filter 200 conveys large debris a distance X over the side of the tank 100 and discharges the debris from the discharge end 220. The discharged debris can be collected by a tank, a conveyor, or another known means. As shown in FIG. 3(A), the funnel 400 preferably includes a widened upper section 410 having a sloped wall 415 extending along the length X to return the water to the tank 100 along substantially the entire length of the conveyor filter 200. As shown in FIG. 4(A), the conveyor filter 200 preferably includes an endless conveyor belt or chain 201 having at least one cross-member 202 attached thereto. Preferably, a plurality of cross-members 202 are provided. The cross-members 202 are moved along a filter 203 from the input end 210 to the discharge end 220 of the conveyor filter 200. As a result, the dirty liquid is separated with particulate material and water passing through the filter 203 and larger debris being pushed along the filter 203 by the cross-members 202 and discharged through the discharge end 220.

In the most preferred embodiment, the filter 203 is a wedge-wire filter having a plurality of closely spaced parallel wedge-wires extending parallel to the traveling direction of the cross-members 202 along the length of the conveyor filter 200. In one exemplary preferred construction, the wedge-wires have a width of about 0.06 inches and are separated by gaps having a width of about 0.02 to 0.04 inches. The cross-members 202 are preferably made of a semi-resilient material, such as plastic, that can deform slightly to fit within the gaps when pressed against the wedge-wires so as to actively clean the gaps when dragged along the length of the wedge-wires. The wedge-wires preferably have a triangular cross-section with upper sides aligned on a generally horizontal plane (i.e., parallel to the bottom of the cross-members) and lower sides creating relief angles to prevent debris from becoming clogged between the wedge-wires. Although less preferred, the wires could have other cross-sectional shapes, such as circular, square or rectangular.

Although less preferred, a woven filter can also be used, such as a woven metal filter. The filter can also be made from a perforated plate. Other known filters can also be used.

Alternatively, the filter portion 203 can be located between the upper and lower horizontal portions of the conveyor belt or chain 201 so that the cross-members 202 move along the filter 203 below the upper horizontal portion of the belt or chain rather than below the lower horizontal portion of the belt or chain as shown in FIG. 4(A). In this latter embodiment, the rotation of the belt or chain would, of course, be in a direction opposite to that shown in FIG. 4(A). In this case, the belt or chain 201 should allow debris and water to pass, e.g., the belt or chain should cover only a small area and/or have a narrow width. The cross-members 202 can also be supported by two separate parallel belts or chains at opposite sides of the cross-members. The input opening 211 can also be located above the conveyor—rather than at one end—to ensure that debris is pushed by the cross-members 202.

In another less preferred embodiment of the conveyor filter 200, the conveyor belt or chain 201, the cross-members 202, and the filter 203 can be replaced with a screen-type or perforated endless conveyor belt which allows liquid to pass through holes in the conveyor belt itself while conveying debris to the discharge end 220.

In another less preferred embodiment of the conveyor filter, an inclined filter, e.g., an inclined parabolic hydrosieve or the like, can be used to convey debris by gravity and/or by the force of the flowing water without the use of conveyor belts or the like.

The terminology "conveyor filter" as used herein encompasses any filter means which actively or passively moves debris laterally while allowing filtered water to pass therethrough.

In one preferred embodiment, the conveyor filter 200 is dimensioned as illustrated, in inches, in FIGS. 3(A), 4(A), 4(B), and 4(C). The conveyor belt or chain 201 is preferably rotatably mounted on shafts 215 and 216. The shaft 216 is preferably laterally positionable within the slot 217 to adjust the tension of the conveyor belt or chain. A motor M, shown in FIGS. 1 and 2, can be mounted on top of the conveyor filter 200 to rotate the conveyor belt or chain 201. Although not illustrated in FIGS. 4(A)–4(C), the container 250 can also include a cover over the top of the container.

As previously described, the dirty liquid from the bottom of the tank 100 is pumped through the conduit C2 by the pump P1 and into the input openings 310 at the sides of the hydrocyclones 300. The dirty water then circulates within the hydrocyclones 300. This circulation causes de-sedimented water to be discharged through the upper outlets 320 and causes concentrated dirty water to be discharged through the lower outlets 330. In the preferred embodiments, between about two to five hydrocyclones 300 are provided. In one preferred embodiment, as illustrated, three hydrocyclones 300 are included. Each of the hydrocyclones preferably has a capacity to circulate about 50 gallons of water per minute. In this manner, approximately 47 gallons per minute of de-sedimented water can be discharged through the outlets 320 of each hydrocyclone while approximately 3 gallons per minute of concentrated dirty water can be discharged downward through each of the outlets 330. In this example, the dirty water is supplied to the hydrocyclones at a pressure of about 30–35 psi. As discussed above, the sizes and numbers of hydrocyclones can be varied as desired. Hydrocyclones come in a variety of sizes, e.g., handling from about 4 gpm to about 500 gpm of dirty water each. Larger hydrocyclones operate at lower pressures end may not remove sediment as effectively, while smaller hydrocyclones may separate very fine particles but operate at substantially higher pressures. The dirty water discharged downward through the outlets 330 can either be discarded or collected in a clarifier or settling tank (not shown) in order to further separate sediment material from the water. An additional pump can be used to pump de-sedimented water from the clarifier or settling tank back into the system S and/or into the tank 100. The clarifier or settling tank would preferably be sufficiently large to have a long enough residence time to provide adequate clarification before recycling or discharging the de-sedimented water. The inclusion of such a tank could substantially increase the size of the system, which could be less desirable when the system is made to be transportable. When transportability is desired, the clarifier or settling tank can be separately transported or can be mounted on the frame 500 (see discussion of frame 500 below).

As shown in FIG. 1, the portable water recycler 10 is preferably mounted on a frame 500. In the illustrated embodiment, the frame 500 is a generally box-shape structure having twelve edge beams 501. The frame can also include lower cross beams 502 and additional support beams 503. It should be understood that the frame is not limited to box-shape structures. The frame, tank, etc., can be made to have a variety of shapes.

As shown in FIGS. 1 and 2, the pump P1 is preferably located below the upper section 101 of the tank 101 upon at least one cross beam 102. As also shown in FIGS. 1 and 2, a second pump P2 is preferably similarly supported upon the frame 500. The second pump P2 sucks de-sedimented water out of the outlet 170 in the tank 100 and into the conduit C5. The second pump P2 further pumps the de-sedimented water through the conduit C6 and back to the system S.

De-sedimented water can also be returned to the system S through the conduit C4 extending from the hydrocyclones 300. Alternatively, the de-sedimented water in the conduit C4 can be directed back into the top of the tank 100. Accordingly, de-sedimented water can be directed back to the system S by both of the conduits C4 and C6 or by only one of these conduits. In this regard, it is possible to even entirely eliminate the suction pump P2 and to return the de-sedimented water to the system S with only the conduit C6. However, in the preferred construction, the pump P2 is included. When the system S is a produce washing system, the returned de-sedimented water can be sprayed over the top of the produce, or can be otherwise delivered to the system S.

As also shown in FIGS. 1 and 2, the portable water recycler preferably includes wheels W mounted to the frame 500 for transportability of the device. Although one wheel is illustrated in the FIGS., it should be apparent that a similar wheel is preferably mounted at the opposite side of the device. In addition, the device can be modified to include 3, 4 or even more wheels.

As shown in FIGS. 5(A)–5(B), the wheels W are preferably mounted on wheel mounting spindles 552 at the lower ends of extendable arms 550. The arms 550 are preferably telescopically received within a cylinder 555 and are extendable by using any known type of jack means, such as a screw shaft or the like. The jack means is preferably manually operated, such as by the ears 560 shown in FIG. 5(B). The wheel height can, thus, be varied to accommodate for uneven terrain at a site location or to allow the frame 500 to rest on the ground.

In order to transport the portable water recycler 10, a trailer hitch mechanism H can be attached to the frame 500. In this manner, the device can be pulled by a tractor or by another pulling vehicle (not shown). The hitch mechanism H can be any known mechanism. Alternatively, rather than functioning as a trailer, the portable water recycler 10 can be constructed as part of a vehicle itself, such as a truck, etc.

In addition, it is contemplated that the present invention can also be constructed as a non-transported device that is permanently mounted and/or stationary at a particular location. In this regard, one preferred embodiment of a permanent installation could include all of the same features as illustrated in the FIGS., except for the wheels and related features shown in FIG. 5(A) and 5(B). The permanent installation can, thus, be a compact structure, allowing more space at a the cite location to be used for other purposes.

The present invention has a variety of advantages over the existing methods and devices for cleaning water.

(1) The present invention enables water to be recycled at a high flow rate while removing a sufficient amount of debris and sediment to render the water suitable for washing.

(2) The present invention enables very high flow rates of recycled water to be produced with a greatly reduced total volume of water in the entire system.

(3) The present inventions enables a relatively small structure to effectively separate sediment at a high flow rate. Unlike settling tanks or ponds which become less effective as size decreases, the present invention does not have similar problems as size is reduced. The present invention can have a tank of less than 1000 gallons, or even less than 500 gallons, or even less than 200 gallons. For produce washing systems, sizes as small as 100 gallons can even be effectively used. Certain other systems S can even use substantially smaller tanks. At lower sizes, the system works well to filter sediment, however, fluctuations in water level increase the risk of running the pumps, etc., dry during operation.

(4) The present invention enables water recyclers to be easily transported and delivered to and from site locations on demand.

(5) The present invention minimizes bacterial contamination issues with recycled water.

(6) The present invention can have substantial environmental benefits, increasing water conservation and decreasing water pollution.

(7) The present invention is not overly complex and can be easily and economically fabricated.

(8) The present invention can also be easier to clean than known settling tanks or ponds, which typically must be drained to be cleaned.

(9) The present invention has particular advantages in the environment of produce washing systems, and especially potato washing systems. In potato washing systems, a large amount of water is often required for cleaning a large quantity of potatoes. As a result, a large amount of water is continually soiled by debris and sediment, such as potato fragments, rocks, field debris, sand, silt, etc. Until the present invention, handling this soiled water has been problematic.

Although the present invention has particular advantages when used with potato washing systems, and is most preferably for such use, the present invention is also very useful for recycling water in other systems. For example, the present invention can be very helpful in recycling water used to clean other produce, such as, for example only, root commodities, citrus commodities, and other fruits and vegetables, including, e.g., beets, yams, sweet potatoes, carrots, apples, oranges, berries, tomatoes, etc. The system can also be used in non-produce applications, e.g., such as in dairy applications. For example, the apparatus could be used to clean dairy waste. Dairy waste (e.g., cow manure) applications would preferably include finer conveyor filter and/or centrifugal separator sizes. In this regard, the waste could be within a large pit, agitated, and run through the present system. As a result, the de-sedimented water can be discharged to a lagoon, or the like, with sediment removed that would otherwise build up therein. This system would be substantially less expensive than current systems handling dairy waste. The present system can be used to recycle any type of liquid and separate solids therefrom in any system requiring such separation. It is contemplated that the dimensions of the tank 100, the sizes and numbers of centrifugal separators 300, the dimensions of the screen 203, etc., can be varied by those in the art depending on the particular circumstances at hand. Other less preferred embodiments can be made by changing one or more component of the various combinations of components, as long as one or more of the many concepts of this invention are maintained. For example, although clearly less preferred, the centrifugal filter 300 could be replaced with another filter means which passes a high volume flow rate of water therethrough.

While the present invention has been shown and described with reference to preferred embodiments presently contemplated as best modes for carrying out the invention, it is understood that various changes may be made in adapting the invention to different embodiments without departing from the broader inventive concepts disclosed herein and comprehended by the claims which follow.

What is claimed is:

1. A portable water recycler which receives dirty water from a system, removes debris and sediment from the dirty water, and returns de-sedimented water to the system, comprising:

a) a supply conduit which supplies dirty water from the system to the portable water recycler;
 b) a conveyor filter which receives the dirty water from said supply conduit and which conveys debris generally laterally while allowing the water to pass generally vertically;
 c) a reclaiming tank below said conveyor filter having a funnel shaped floor with a discharge outlet;
 d) a funnel below said conveyor filter which directs the filtered water from said conveyor filter to a lower region of said reclaiming tank, said funnel having an outlet located above said discharge outlet of said reclaiming tank;
 e) a discharge conduit extending from said discharge outlet to at least one centrifugal separator, each said centrifugal separator having a first outlet which outputs de-sedimented water and a second outlet which outputs concentrated dirty water; and
 f) a return conduit for returning de-sedimented water to the system from an upper region of said reclaiming tank or from said first outlet of each said centrifugal separator.

2. The portable water recycler of claim 1, further including at least one wheel for transporting the portable water recycler to a desired location.

3. The portable water recycler of claim 1, further including a frame supporting said tank, said conveyor filter, and said centrifugal separators, and a plurality of wheels mounted to said frame for transporting the portable water recycler to a desired location.

4. The portable water recycler of claim 3, further including a hitch mechanism mounted to said frame for pulling said portable water recycler behind a towing vehicle.

5. The portable water recycler of claim 4, further including a centrifugal separator pump supported on said frame for pumping the dirty water to said centrifugal separator, and a pump supported on said frame for sucking de-sedimented water from an upper region of said tank.

6. The portable water recycler of claim 1, further including means for permanently installing the portable water recycler at a side location.

7. The portable water recycler of claim 5, wherein said means for permanently installing includes a frame supporting said reclaiming tank, said conveyor filter, and said centrifugal separator, said frame resting on a ground or floor surface.

8. The portable water recycler of claim 1, wherein said conveyor filter includes a filter and a conveyor belt or chain having at least one cross member for pushing debris along said filter.

9. The portable water recycler of claim 1, wherein said filter has openings with a diameter less than about 0.05 inches.

10. The portable water recycler of claim 1, wherein said filter has openings with a diameter less than about 0.04 inches.

11. The portable water recycler of claim 1, wherein said filter has openings with a diameter between about 0.02 and 0.04 inches.

12. The portable water recycler of claim 1, wherein said filter is a wedge-wire filter.

13. The portable water recycler of claim 1, wherein said filter is a woven-wire filter.

14. The portable water recycler of claim 1, wherein said tank holds less than 1000 gallons of water.

15. The portable water recycler of claim 1, wherein said tank holds less than 500 gallons of water.

16. The portable water recycler of claim 1, wherein said at least one centrifugal separator includes at least two hydrocyclones.

17. The portable water recycler of claim 1, wherein said at least one centrifugal separator includes at least one centrifugal separator which removes silt.

18. The portable water recycler of claim 1, wherein said conveyor filter has an elongated housing which extends substantially across an upper side of said tank and which extends substantially over a side of said tank at a discharge end of said conveyor filter.

19. In combination:
1) a produce washing system for washing produce with water; and
2) a portable water recycler which receives dirty water from the produce washing system, removes debris from the dirty water, and returns de-sedimented water to the produce washing system, comprising:
    a) a supply conduit which supplies dirty water from the produce washing system to the portable water recycler;
    b) a conveyor filter which receives the dirty water from said supply conduit and which removes and conveys debris generally horizontally while allowing the water to pass generally vertically;
    c) a reclaiming tank below said conveyor filter having a funnel shaped floor with a discharge outlet;
    d) a funnel below said conveyor filter which directs the filtered water from said conveyor filter to a lower region of said reclaiming tank, said funnel having an outlet located above said discharge outlet of said reclaiming tank;
    e) a discharge conduit extending from said discharge outlet to at least one centrifugal separator, each said centrifugal separator having a first outlet which outputs de-sedimented water and a second outlet which outputs concentrated dirty water; and
    f) a return conduit for returning de-sedimented water to the produce washing system from an upper region of said reclaiming tank or from said first outlet of each said centrifugal separator.

20. The combination of claim 19, wherein said produce washing system is a potato washing system.

21. A method of receiving dirty water from a system, removing debris from the dirty water, and returning de-sedimented water to the system, comprising the steps of:
    a) supplying dirty water from the system through a supply conduit;
    b) receiving the dirty water from the supply conduit in a conveyor filter, and removing and conveying debris generally horizontally while allowing the water to pass generally vertically with the conveyor filter;
    c) directing the water which passes to a reclaiming tank below the conveyor filter having a funnel shaped floor with a discharge outlet, said step of directing including directing the water with a funnel below the conveyor filter to a lower region of the reclaiming tank, the funnel having an outlet located above the discharge outlet of the reclaiming tank;
    e) directing dirty water through the discharge outlet of the reclaiming tank to at least one centrifugal separator, each centrifugal separator having a first outlet which outputs de-sedimented water and a second outlet which outputs dirty water; and
    f) returning de-sedimented water to the system from an upper region of the reclaiming tank or from the first outlet of each centrifugal separator.

22. The method of claim 21, further including the steps of supporting the reclaiming tank, the conveyor filter, and the centrifugal separator on a frame, providing a plurality of wheels on the frame, and transporting the frame with the wheels to a desired location.

23. The method of claim 21, further including the step of towing the frame via a hitch mechanism mounted to the frame.

24. The method of claim 21, further including the step of permanently installing the portable water recycler at a side location.

25. The method of claim 24, further including supporting the reclaiming tank, the conveyor filter, and the centrifugal separator on a frame and resting the frame on a ground or floor surface.

26. A portable water recycler which receives dirty water from a system, removes debris and sediment from the dirty water, and returns de-sedimented water to the system, comprising:
    a) a supply conduit which supplies dirty water from the system to the portable water recycler;
    b) a conveyor filter which receives the dirty water from said supply conduit and which conveys debris generally laterally while allowing the water to pass generally vertically;
    c) a reclaiming tank below said conveyor filter having an inclined floor with a bottom discharge outlet;
    d) a funnel below said conveyor filter which directs the filtered water from said conveyor filter to a lower region of said reclaiming tank, said funnel having an outlet located above said discharge outlet of said reclaiming tank;
    e) a discharge conduit extending from said discharge outlet to at least one filter means for removing sediment from a high volume flow of water and having an outlet for discharging de-sedimented water; and
    f) a return conduit for returning the de-sedimented water to the system from an upper region of said reclaiming tank or from said outlet of said filter means.

27. The portable water recycler of claim 26, further including at least one wheel for transporting the apparatus to a desired location.

28. The portable water recycler of claim 26, further including a frame supporting said tank, said conveyor filter, and said filter means.

29. The portable water recycler of claim 28, further including a plurality of wheels mounted to said frame for transporting the portable water recycler to a desired location.

30. The portable water recycler of claim 26, wherein said return conduit returns the de-sedimented water to the system only from said outlet of said filter means.

* * * * *

UNITED STATES PATENT AND TRADEMARK OFFICE
CERTIFICATE OF CORRECTION

PATENT NO. : 5,833,868
DATED : November 10, 1998
INVENTOR(S) : Rick W. Bajema

It is certified that error appears in the above-indentified patent and that said Letters Patent is hereby corrected as shown below:

<u>In the Claims:</u> Col. 10, line 41 (claim 6), "side" should be -- site --; Col. 10, line 42 (claim 7), "5" should be -- 6 --; Col. 12, line 17 (claim 24), "side" should be -- site --.

Signed and Sealed this

Twenty-second Day of June, 1999

Attest:

Q. TODD DICKINSON

*Attesting Officer*    *Acting Commissioner of Patents and Trademarks*